Aug. 20, 1957 W. F. LINSTEDT 2,803,174
CARTON LINING MACHINE
Filed Nov. 3, 1952 17 Sheets-Sheet 3

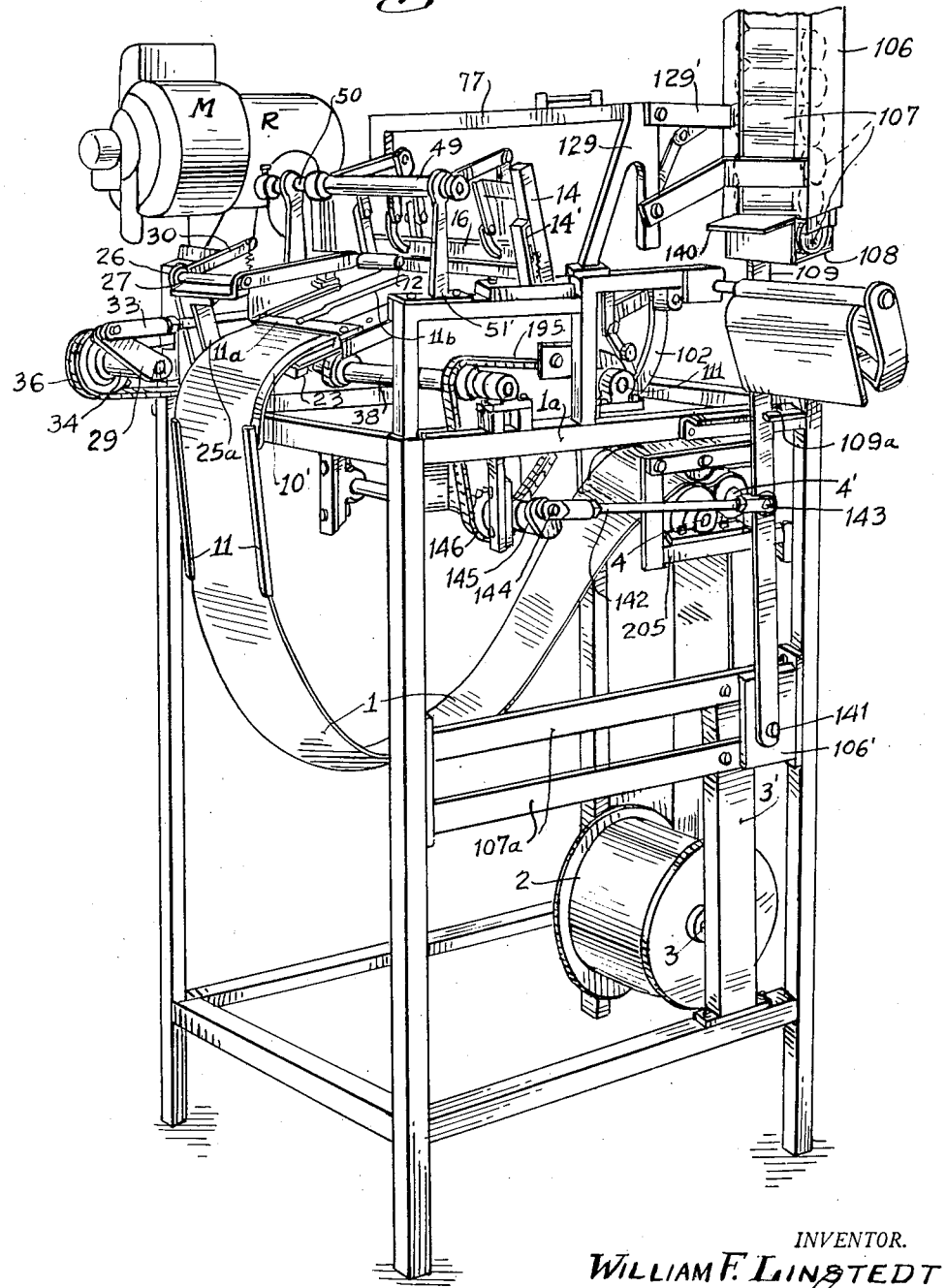

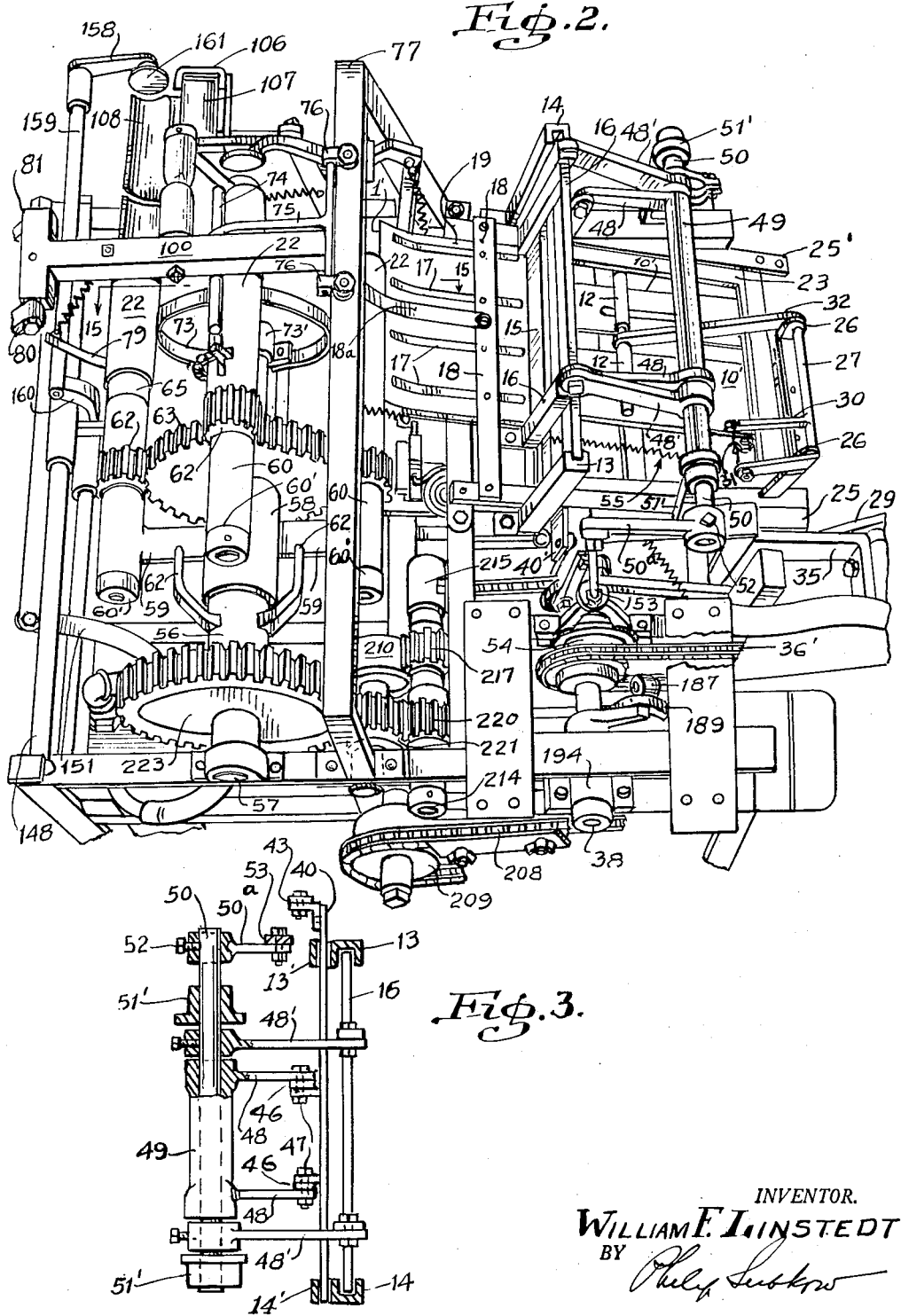

INVENTOR.
WILLIAM F. LINSTEDT
BY
ATTORNEY.

Aug. 20, 1957 W. F. LINSTEDT 2,803,174
CARTON LINING MACHINE
Filed Nov. 3, 1952 17 Sheets-Sheet 5

INVENTOR.
WILLIAM F. LINSTEDT
BY
ATTORNEY.

Aug. 20, 1957 W. F. LINSTEDT 2,803,174
CARTON LINING MACHINE
Filed Nov. 3, 1952 17 Sheets-Sheet 6

INVENTOR.
WILLIAM F. LINSTEDT
BY
ATTORNEY.

Aug. 20, 1957 W. F. LINSTEDT 2,803,174
CARTON LINING MACHINE
Filed Nov. 3, 1952 17 Sheets-Sheet 7

INVENTOR.
WILLIAM F. LINSTEDT
BY
ATTORNEY.

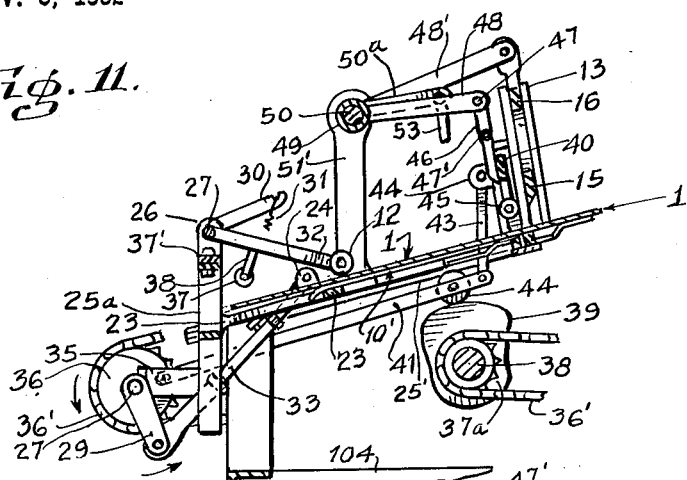
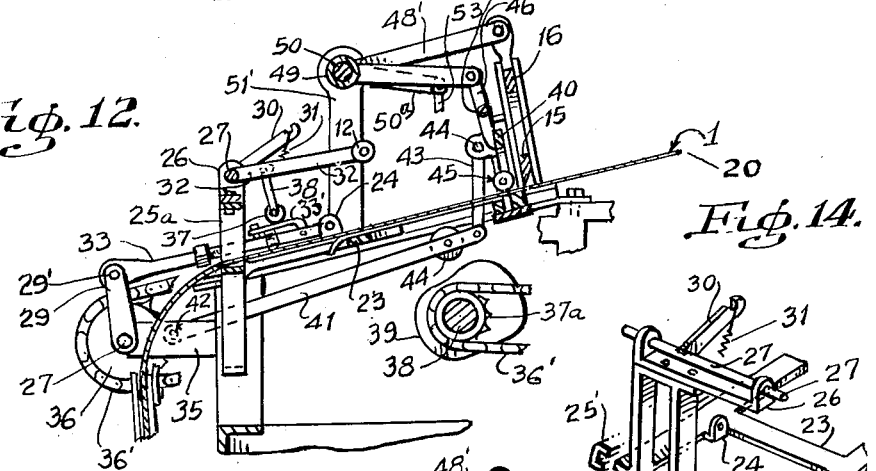
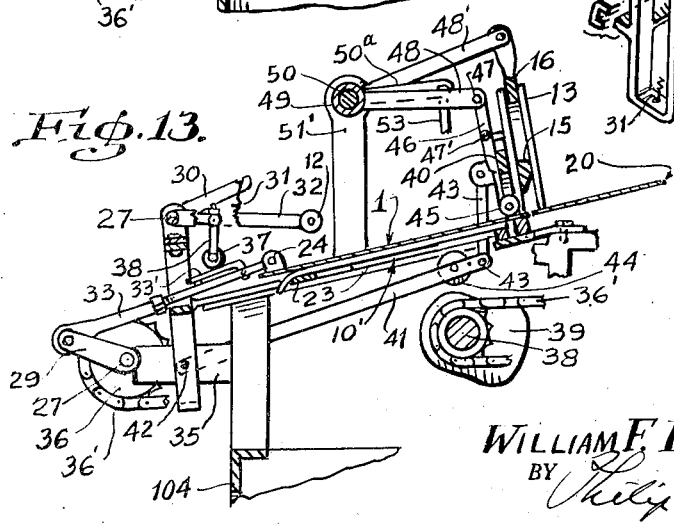

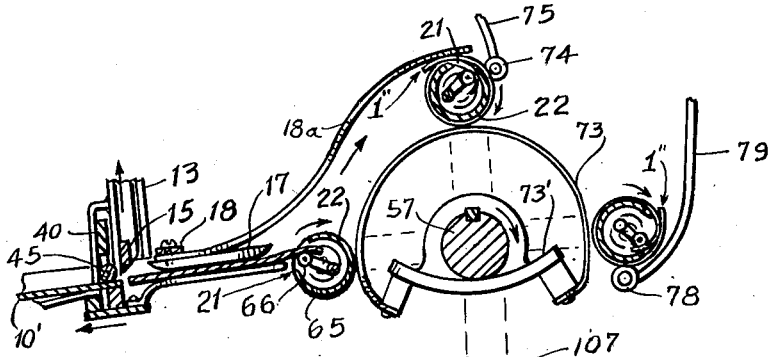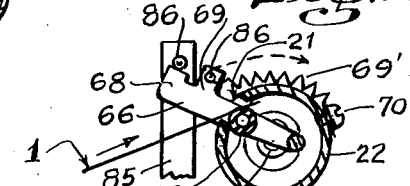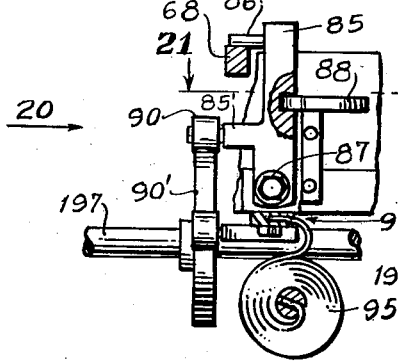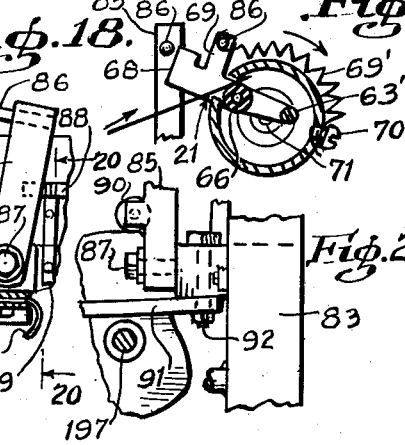

Fig. 22.

Aug. 20, 1957 W. F. LINSTEDT 2,803,174
CARTON LINING MACHINE
Filed Nov. 3, 1952 17 Sheets-Sheet 11

INVENTOR.
WILLIAM F. LINSTEDT
BY
ATTORNEY.

Aug. 20, 1957 W. F. LINSTEDT 2,803,174
CARTON LINING MACHINE
Filed Nov. 3, 1952 17 Sheets-Sheet 12
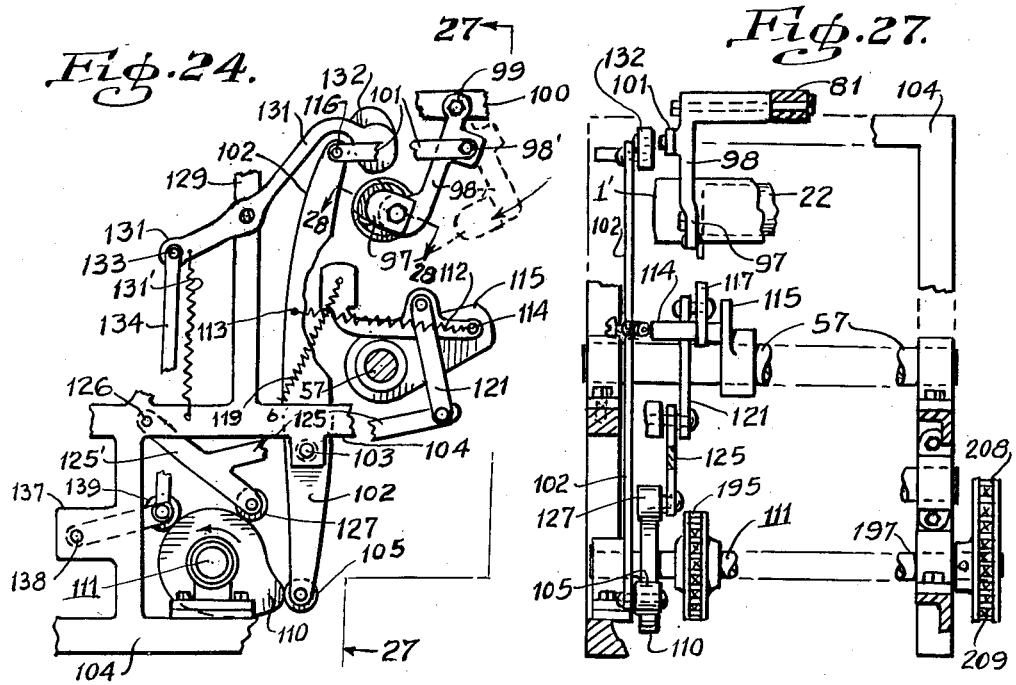
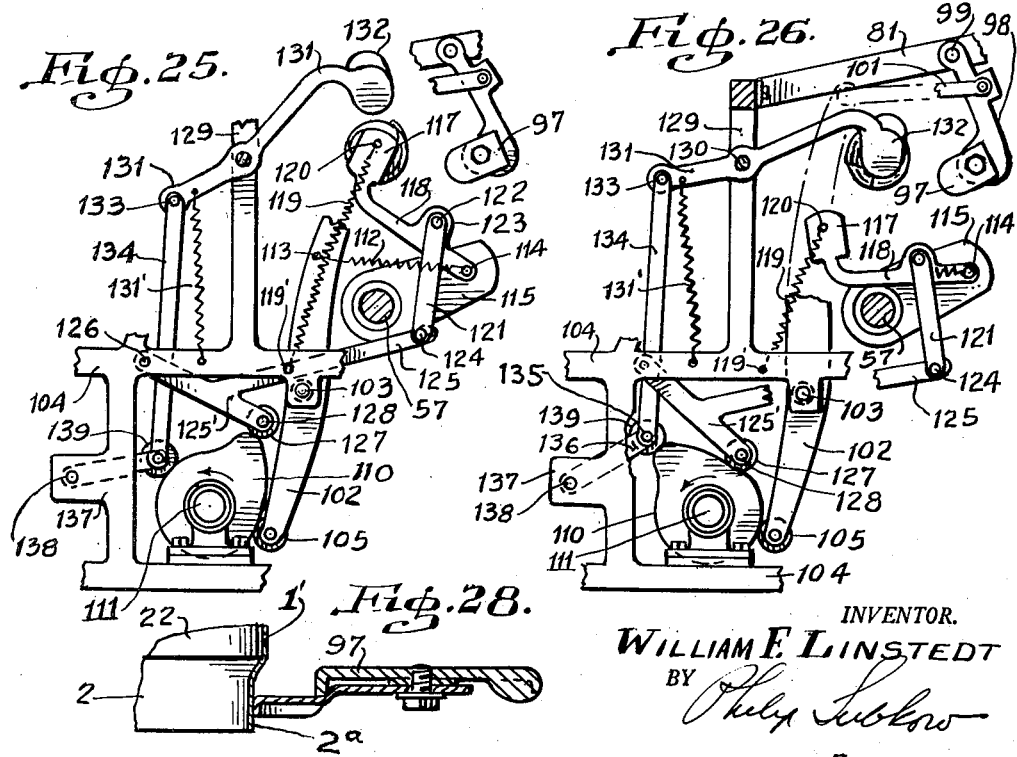
INVENTOR.
WILLIAM F. LINSTEDT
BY
ATTORNEY.

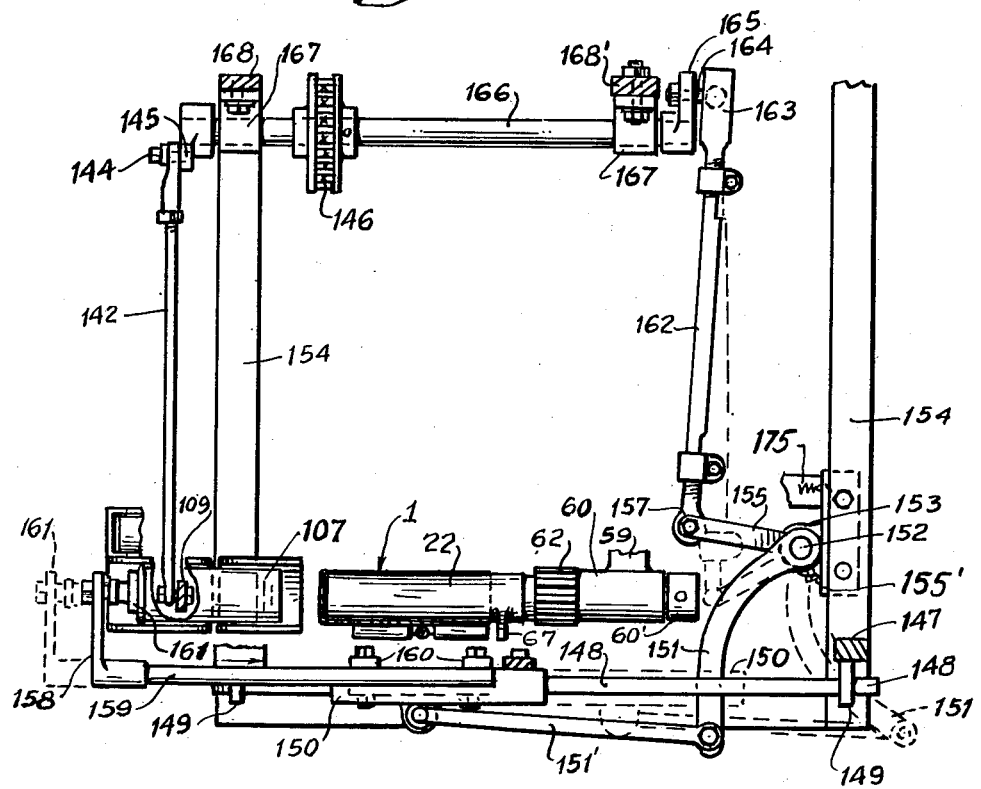

Aug. 20, 1957 W. F. LINSTEDT 2,803,174
CARTON LINING MACHINE
Filed Nov. 3, 1952 17 Sheets-Sheet 14
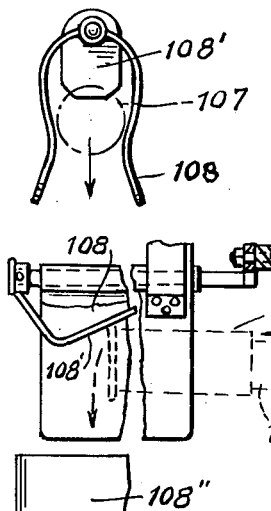
Fig. 36a.
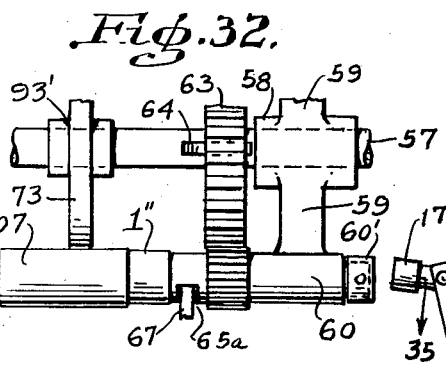
Fig. 32.
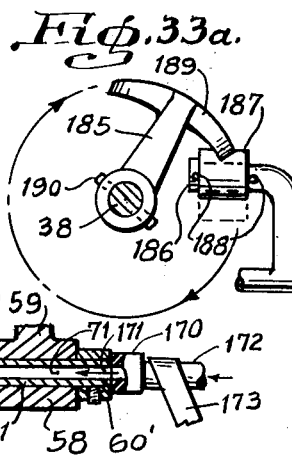
Fig. 33a.
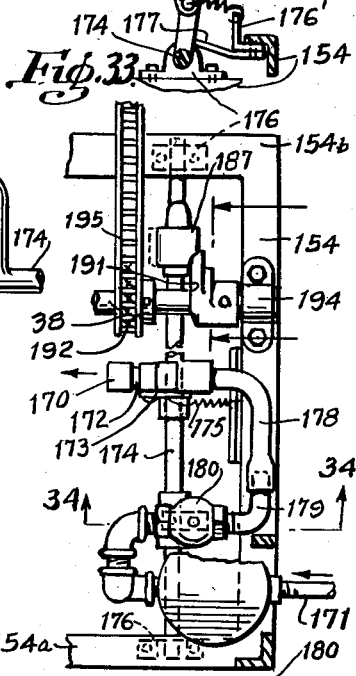
Fig. 33.
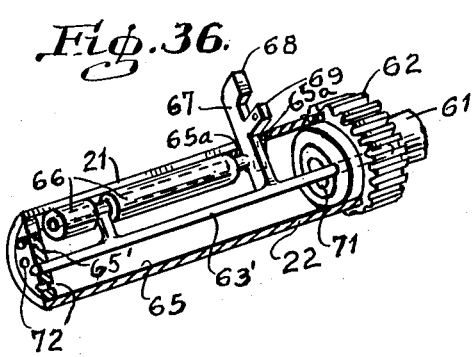
Fig. 35.
Fig. 36.
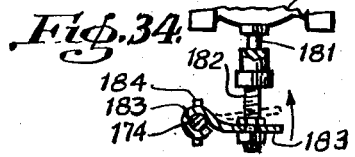
Fig. 34.
INVENTOR.
WILLIAM F. LINSTEDT
BY
ATTORNEY.

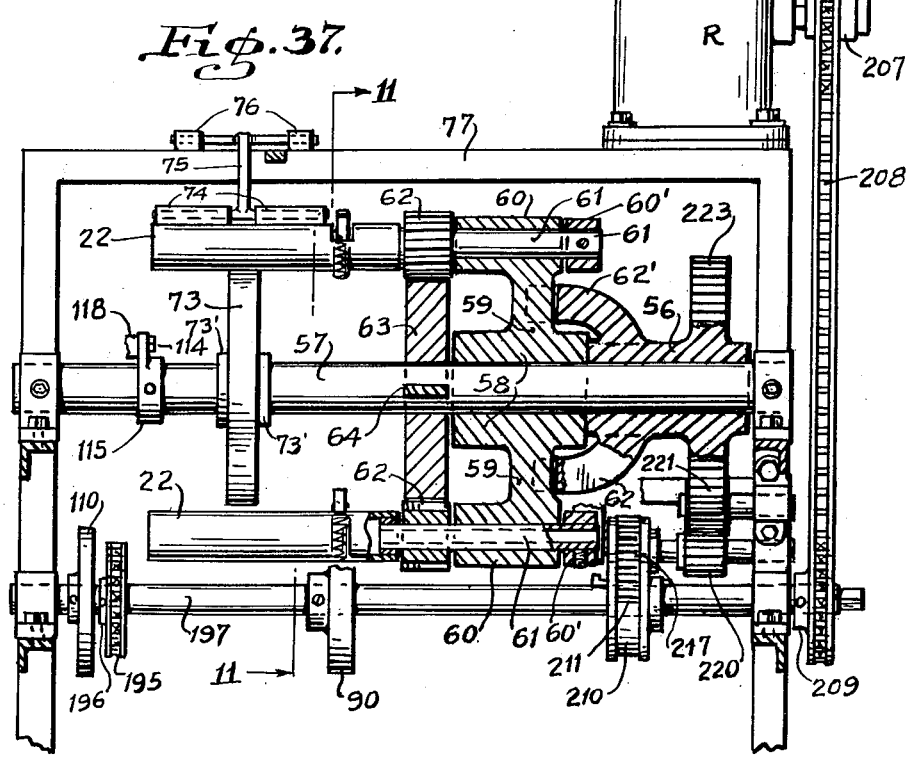
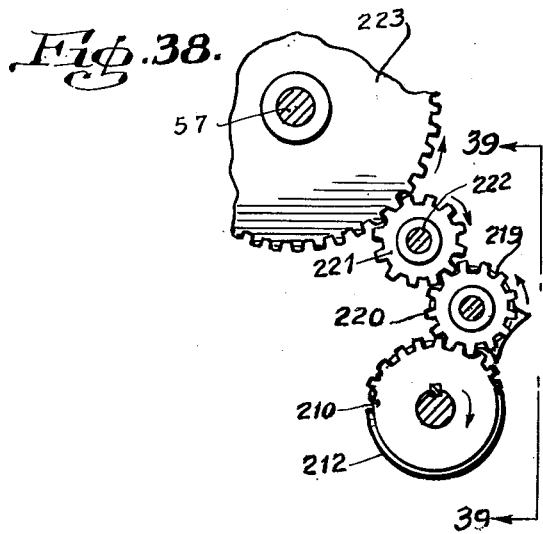
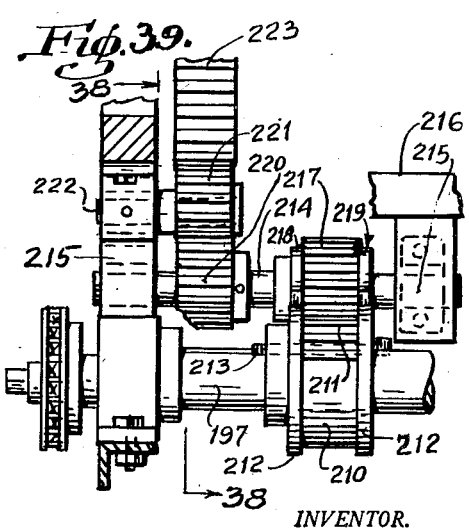

Aug. 20, 1957 W. F. LINSTEDT 2,803,174
CARTON LINING MACHINE
Filed Nov. 3, 1952 17 Sheets-Sheet 16

INVENTOR.
WILLIAM F. LINSTEDT
BY
ATTORNEY.

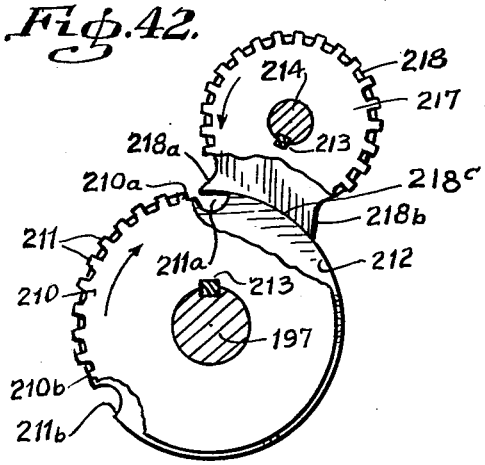
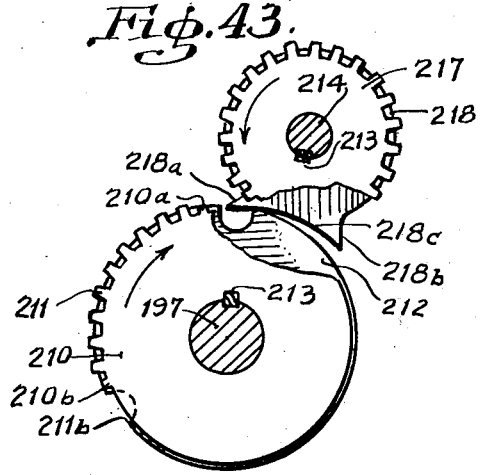
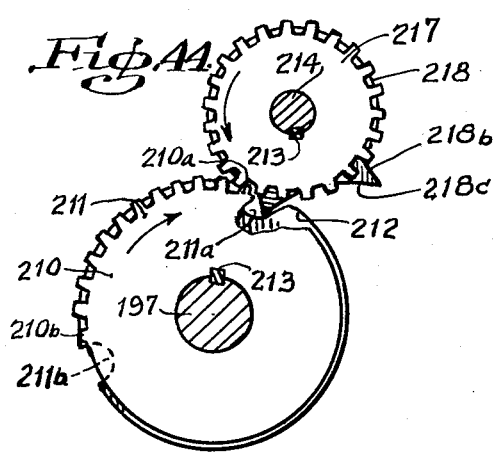
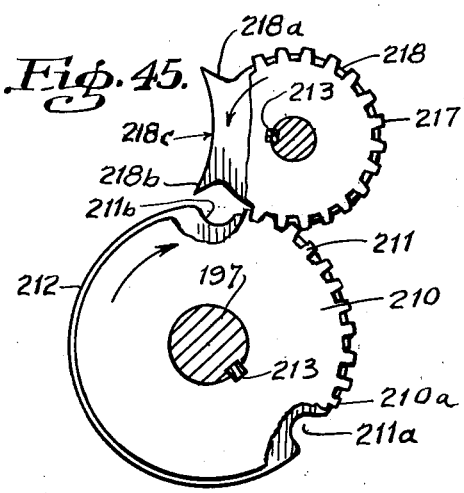
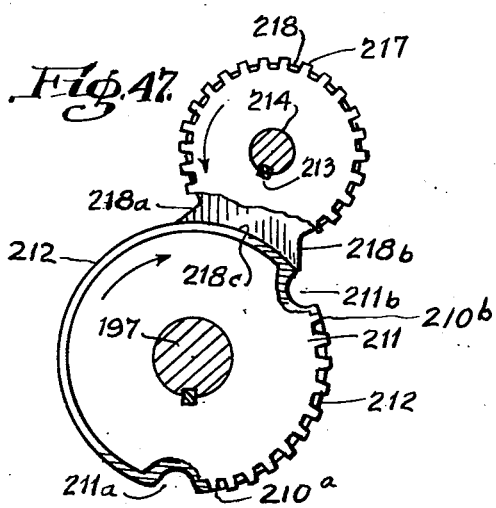
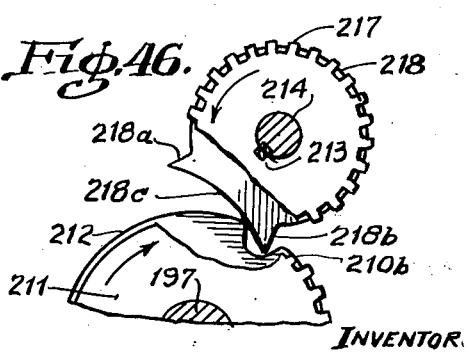

United States Patent Office 2,803,174
Patented Aug. 20, 1957

2,803,174

CARTON LINING MACHINE

William F. Linstedt, Plymouth, Wis., assignor to Ready-To-Bake Foods Inc., Los Angeles, Calif., a corporation of California Application November 3, 1952, Serial No. 318,490

1 Claim. (Cl. 93—36.01)

This invention relates to a machine for automatically lining containers with sheet material.

For many uses it is desirable to separate the contents of a container from the container wall. This has been accomplished for some purposes by placing the contents in a closed bag and inserting the bag in the container. In other uses, especially in packaging biscuit dough, the material, for example, the dough, is wrapped in a foil laminated paper wrapper and the wrapper overfolded to enclose the dough and the wrapper inserted into the container.

It is an object of my invention to design a machine which will insert into a container, a wrapper so formed that it may receive and enclose and separate the contents of the container from the walls of the container.

While I have designed the machine particularly for use in packaging biscuit dough, the container may be used to package other material. Those skilled in the art will readily recognize that the invention described herein below is readily adaptable to various sizes and configurations of wrapper or containers.

It is an object of my invention to line a container with a sheet of material by means of automatically operating mechanism.

It is a further object of my invention to line a tubular container with a tubular liner of sheet material.

It is a further object of my invention to line a tubular container closed at one end and open at the other with a liner which lines the tubular side wall and closed end of the container.

It is a further object of my invention to so line a tubular container, by forming a sheet of material into a tube with one end folded over so as to line the cylindrical sides and the closed end of the container.

I have devised a machine for so lining the container automatically.

The tube lining machine of my invention contains the following features.

These and other objects of my invention will be further described in connection with the drawing, in which Fig. 1 is a view in perspective of the machine with some parts not included for clearer showing of other parts;

Fig. 2 is a perspective top view of the machine with parts removed;

Fig. 3 is a fragmentary detail partly in section;

Fig. 11 is a partial section taken on line 11—11 of Fig. 6;

Fig. 12 is a view similar to Fig. 11;

Fig. 13 is a view similar to Figs. 11 and 12;

Fig. 14 is a perspective view of the paper feed slide shown in Figs. 6 and 11;

Fig. 15 is a fragmentary section taken on line 15—15 of Fig. 2;

Fig. 16 is a detail shown also in Figs. 22 and 23;

Fig. 17 is a section taken on line 17—17 of Fig. 22;

Fig. 18 is a view similar to Fig. 17;

Fig. 19 is a similar view of Fig. 16;

Fig. 20 is a partial side view taken on line 20—20 of Fig. 17;

Fig. 21 is a fragmentary section taken on line 21—21 of Fig. 17;

Fig. 22 is a partial section taken on line 22—22 of Fig. 7 with parts omitted for clearer showing;

Fig. 24 is a fragmentary detail of the tucker mechanism shown also in Fig. 4;

Fig. 25 is a view similar to Fig. 24;

Fig. 26 is a view similar to Fig. 24;

Fig. 27 is a view taken on the line 27—27 of Fig. 24;

Fig. 28 is a section taken on line 28—28 of Fig. 24;

Fig. 29 is an irregular staggered section taken on line 29—29 of Fig. 4;

Fig. 30 is a fragmentary detail partly in section and with parts broken away, shown also in Fig. 7;

Fig. 31 is a view partly in section taken on line 31—31 of Fig. 30;

Fig. 32 is a fragmentary detail of parts shown also in Fig. 7;

Fig. 33 is a fragmentary section taken on line 40—40 of Fig. 5, showing a detail of the view shown in Fig. 40;

Fig. 33a is a detail of the sector cam and cam roll arm shown in Fig. 33;

Fig. 34 is a fragmentary view taken on the line 34—34 of Fig. 33;

Fig. 35 is a section taken on line 35—35 of Fig. 32;

Fig. 36 is a perspective view partly in section taken through the mandrel;

Fig. 36a is an end view of the detail shown in Fig. 32;

Fig. 37 is a fragmentary detail, partly in section, of parts shown also in Fig. 7;

Fig. 38 is a fragmentary section taken on line 38—38 of Fig. 39;

Fig. 39 is a view taken on line 39—39 of Fig. 38;

Fig. 42 is a fragmentary view, partly schematic, of the intermittent gear and its driven pinion;

Fig. 43 is a view similar to Fig. 42;

Fig. 44 is a view similar to Fig. 43;

Fig. 45 is a view similar to Fig. 44;

Fig. 46 is a view similar to Fig. 45;

Fig. 47 is a view similar to Fig. 46.

Paper feed mechanism

Figure 9:
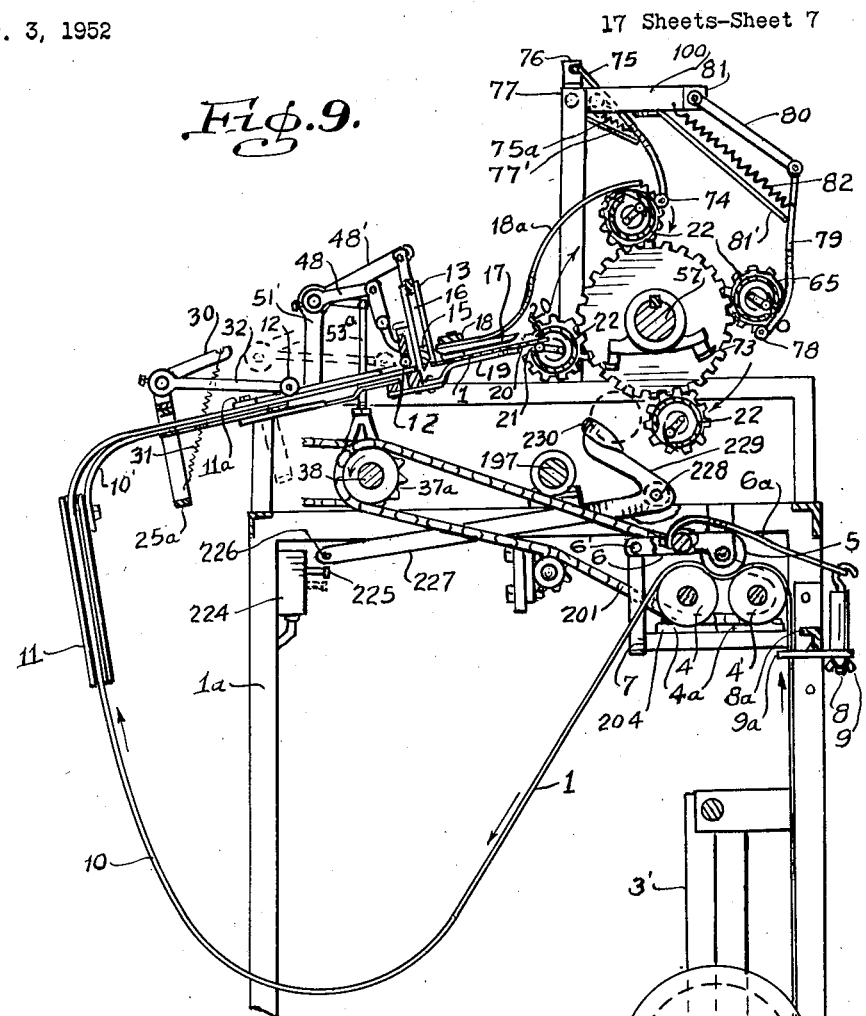
Fig. 9 is a view partly in section taken on the line 9—9 of Fig. 7.

The paper roll 2 (see Figs. 1 and 9) carrying a web of paper 1 is mounted on the paper roll spindle 3, rotatably mounted upon the stand frame 3'. The paper 1 passes over the paper feed rolls 4 and 4' (see Figs. 1 and 40) each journalled side by side in the bearings 4a. A pressure roll 5 (see Fig. 4) is rotatably mounted on the arm 6, which is in turn pivoted upon pivot pin 6', mounted on the frame member 7. The sheet of paper 1 passes over the rolls 4 and 4' and under the roll 5. Roll 5 presses the paper against the rolls 4 and 4' with a pressure regulated by the screw 8, tensioned by the thumb nut 9, pressing against frame member 9a, which pulls down on the extension arm 6a of arm 6.

Figure 10:
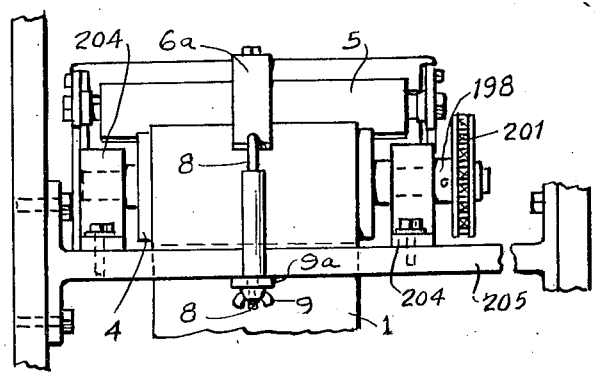
Fig. 10 is a detail shown also in Fig. 7.

The paper passes in a loop 10 (see Figs. 9 and 10) to and over the inclined apron 10' (see Fig. 1) which acts as an inclined table on which the paper rests and which guides the paper. The paper passes (see Figs. 1 and 9) between the side slide guides 11 and underneath the bar 11a and the top guide 11b and then under the nonrotating feed rollers 12 (see Figs. 1, 9–13 inc.) and between vertical knife slide guides 13 and 14 (see Figs. 2, 4, 9, 11–13, inc.) and underneath the knife 15 mounted on the knife slide 16.

The flat guide springs 17 (see Figs. 2 and 9) are mounted on a guide spring bar 18 and above the lower flat guide plate 19 (see Fig. 9) on which is mounted the bar 18 upon which the arcuate paper guide 18a (see Figs. 2–9, and 15) is also mounted. The guides 17 are in the form of a plurality of spaced spring fingers which prevent the buckling of the paper on the guide plate 19 so as to guide the leading edge 20 (see Fig. 9) of the paper 1 into the slot 21 of the tubular mandrel 22, as will be more fully described below.

The paper feeder mechanism (see Figs. 1, 6, 9, 11–13, inc.) includes the slide 23 carrying an ear 24. This slide 23 is slidably mounted in two guideways 25 and 25'. The slide carries a vertical frame 25a on which is positioned a bracket 26 in which is journalled the shaft 27, in suitable bearings 28. The shaft 27 carries a lever arm 32, on which the non-rotating rollers 12 are mounted, and a depending arm 38 carries a roller 37.

Mounted on the shaft 27, suitably secured to the arm as by welding, is an arm 30, to the outer end of which is attached the tension spring 31, connected at its other end to the frame 25a. To the ear 24 is connected the connecting rod 33 which is connected at its other end to the crank arm 29 which is mounted to the short shaft 27. This shaft (see Figs. 6 and 11–13, inc. and 40) is journalled in a bearing 34 mounted on the L-shaped bracket 35 which is fastened to the main frame 1a (see Fig. 40). Mounted on the connecting rod 33 is a bracket 33' (see Figs. 11–13, inc.). On the outer end of the crank shaft 27 is mounted a driven sprocket 36 revolved by the chain 36' which is driven by the sprocket 37a (see Figs. 6 and 40) on shaft 38.

The standards 51' (see Figs. 1–3, 11–13, inc.) mounted upon the frame carry the shaft 50. On the shaft 50 is rotatably mounted a sleeve 49. To the shaft 50 is rigidly connected the lever arm 50a, by means of a set screw 52, which passes through the hub to which the arm 50a is connected. The eccentric connecting rod 53, operating by means of an eccentric 54 to be described below, is connected to the arm 50a. Rigidly mounted upon the sleeve 49 are the arms 48 which are connected by the pin 47 to links 46 pivoted on the slide 40 by pins 47'.

To the links 46 are connected the pressure roll slide 40 operating in guideways 13' and 14'. The slide 40 carries the pressure rollers 45.

The pressure slide 40 has an extension 40' (see Fig. 6) to which is connected the link 43 (see Figs. 6 and 11–13 inc.), pivotally mounted on the pressure slide extension 40' and pivotally connected to the end of the cam lever 41 which carries the cam roller 44 coacting with the cam 39. The other end of the cam lever 41 is pivoted on the bracket 35 on pivot pin 42 (see Figs. 4, 11–13 inc., 23 and 40). The slide 40 and the slide extension 40' are tensioned by means of the spring 55 (see Fig. 6) which is connected to the slide extension 40' and to the bracket 51'. The two arms 48 (see Figs. 2, 6, 11–13 inc.) are each rigidly mounted near the end of the shaft 50 and are each pivotally connected to the slide 40.

*Turret mechanism*

Figure 7:
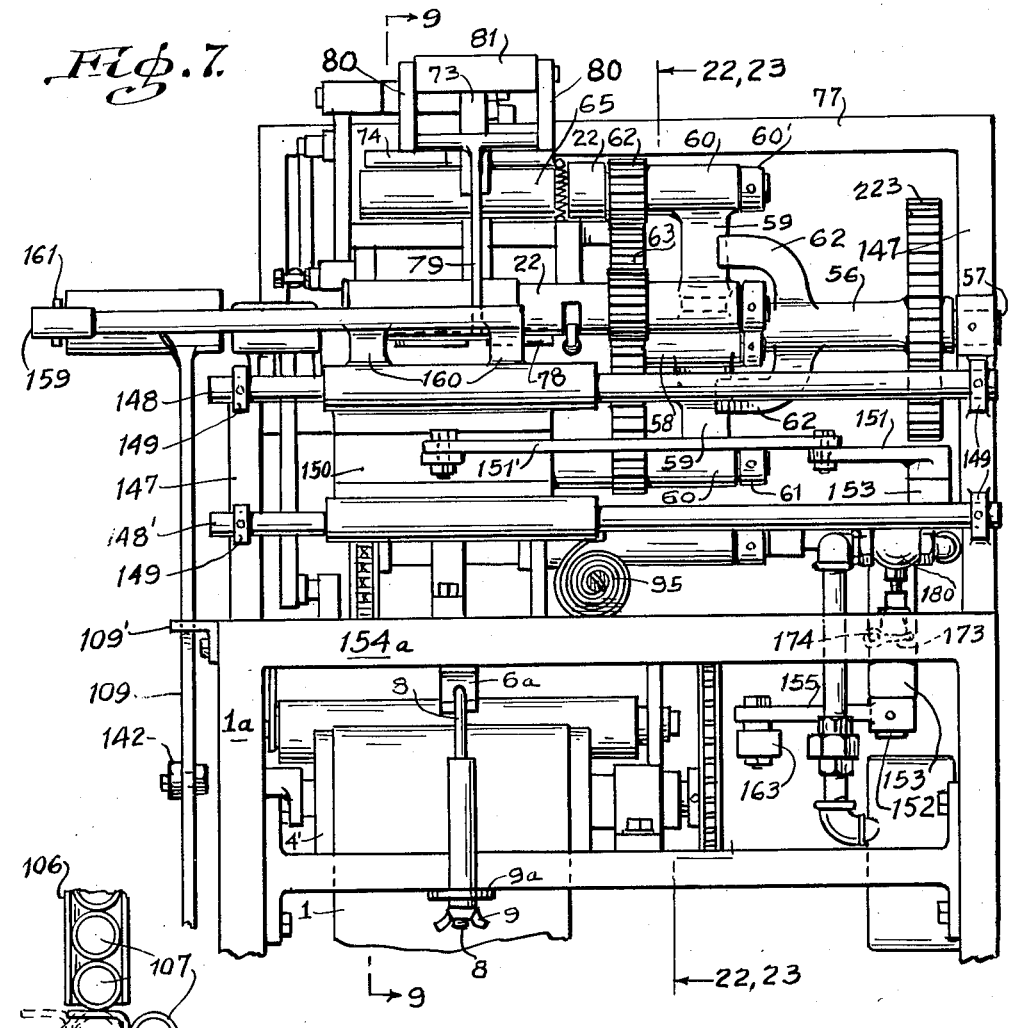
Fig. 7 is a front view of the machine with parts removed for clearer showing of other parts.
Figure 8:
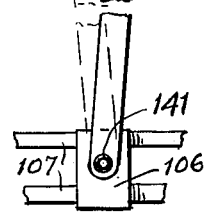
Fig. 8 is a detail shown in Fig. 4.

The hub 56 is rotatably mounted upon the stationary shaft 57 (see Figs. 2, 7 and 37). The hub 56 carries the gear 223. The turret is mounted on four spider arms 59, connected 90° apart to the hub 56 rotatably mounted on shaft 57. Two dog type arms 62' are forked over two of the arms 59 180° apart.

At the outer end of each of the spider arms 59 and integral therewith are the bearing hubs 60 in which the tubular shafts 61 of the mandrel 22 are journalled.

The shafts 61 carry spur gears 62 (see Figs. 2, 7 and 37) which act as planetary gears in mesh with the sun gear 63 which is secured to the stationary shaft 57 by means of a key 64. A mandrel 22 is carried at one end thereof on the extension of the shaft 61, i. e. beyond the spur gear 62 and shaft 61 is retained in the bearing 60 by the collar 60'. The opposite end of the mandrel is unsupported and free. The mandrels 22 are hollow and have a slot 21 which extends from the trip slot 65a which is perpendicular to the slot 21, to the free end of the mandrel and through the perforated end closure plate 65' (see Figs. 35, 36 and 37).

The shaft 61 is bored with an interior bore 71 which extends from one end to the other end and communicates with the interior of the mandrel 22; the mandrel is vented through vent holes 72 in the closure plate 65' at the free end of the mandrel.

*Paper gripping mechanism*

Mounted within the mandrel 22 (see Figs. 15–17, inc., 22 and 36) is the rock shaft 63' pivotally mounted, off center of the shaft 61, at both ends of the mandrel 22 at a point diametrically opposite to the slot 21. The rock shaft 63' carries a roller 66 and a grip lever 67 carrying an end dog 68 and an intermediate ear 69. The lever extends through the transverse slot 65a. The spring 69' is connected to the ear 69 and passes over the exterior surface of the mandrel 22 and is connected to a screw 70 mounted upon the exterior surface of the mandrel 22. All the mandrels 22 are similarly constructed.

*Paper winding blades and holding rollers*

On the bracket 73', mounted on and keyed to the shaft 57, and intermediate the ends of the mandrels 22 (see Figs. 2, 15 and 37) is a spring steel loop 73 which contacts the surface of the mandrels at both the first and the second station of the mandrels. The loop does not contact the mandrel at the third or fourth station. The spring guide 18a (see Figs. 2, 9, 15 and 22) is connected to the bar 18 and passes in an upward sweeping loop over and out of contact with the mandrel in the first station and contacts the upper surface of the mandrel 22 in the second station. Roller 74 (see Figs. 5, 9, 15 and 37) is rotatably mounted upon an arm 75 which is pivoted upon the brackets 76 positioned on frame member 77 (see Figs. 2, 9 and 15). The roller 74 presses against the surface of the mandrel 22 in the second station at a point several degrees clockwise of the point of contact of the spring steel finger 18a. The arm 75 is under tension of a spring 75a connected to the arm 75 and the frame member 77. A stop 77' is connected to the bracket 77 so as to be a limit motion stop for the arm 75.

The roller 78 (see Figs. 5, 7, 9 and 15) rides over the underneath portion of the mandrel 22, in third station, and is rotatably mounted upon the arm 79 which is pivotally mounted upon the stationary link 80 which, in turn, is mounted upon the bracket 81 on frame extension 100. The arm 79 is tensioned by a spring 82 connected to the frame extension 100 and the arm 79 and a limit motion stop arm 81' is connected to the bracket 81 and acts to limit the motion of the arm 79.

*Paper gripper trip mechanism*

Figure 23:
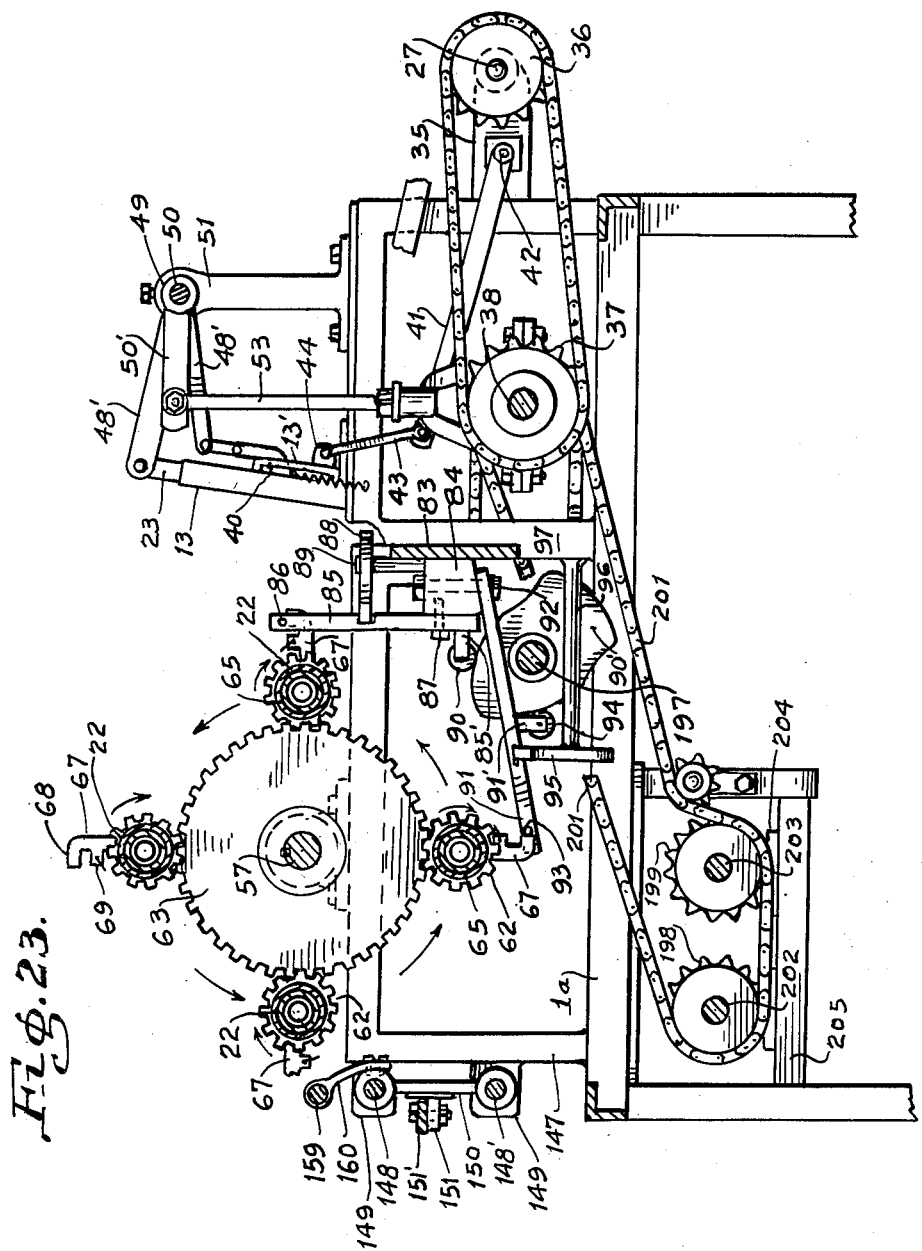
Fig. 23 is a section taken on line 23—23 of Fig. 7 with parts omitted for clearer showing.

Mounted on the frame cross member 83 (see Figs. 22 and 23) adjacent the mandrel at the first station is the bracket 84 on which the vertical lever 85 is pivoted on pivot stud 87. A pin 86 is mounted at the upper end of the lever 85 (see also Figs. 16–19, inc.).

Figure 22:
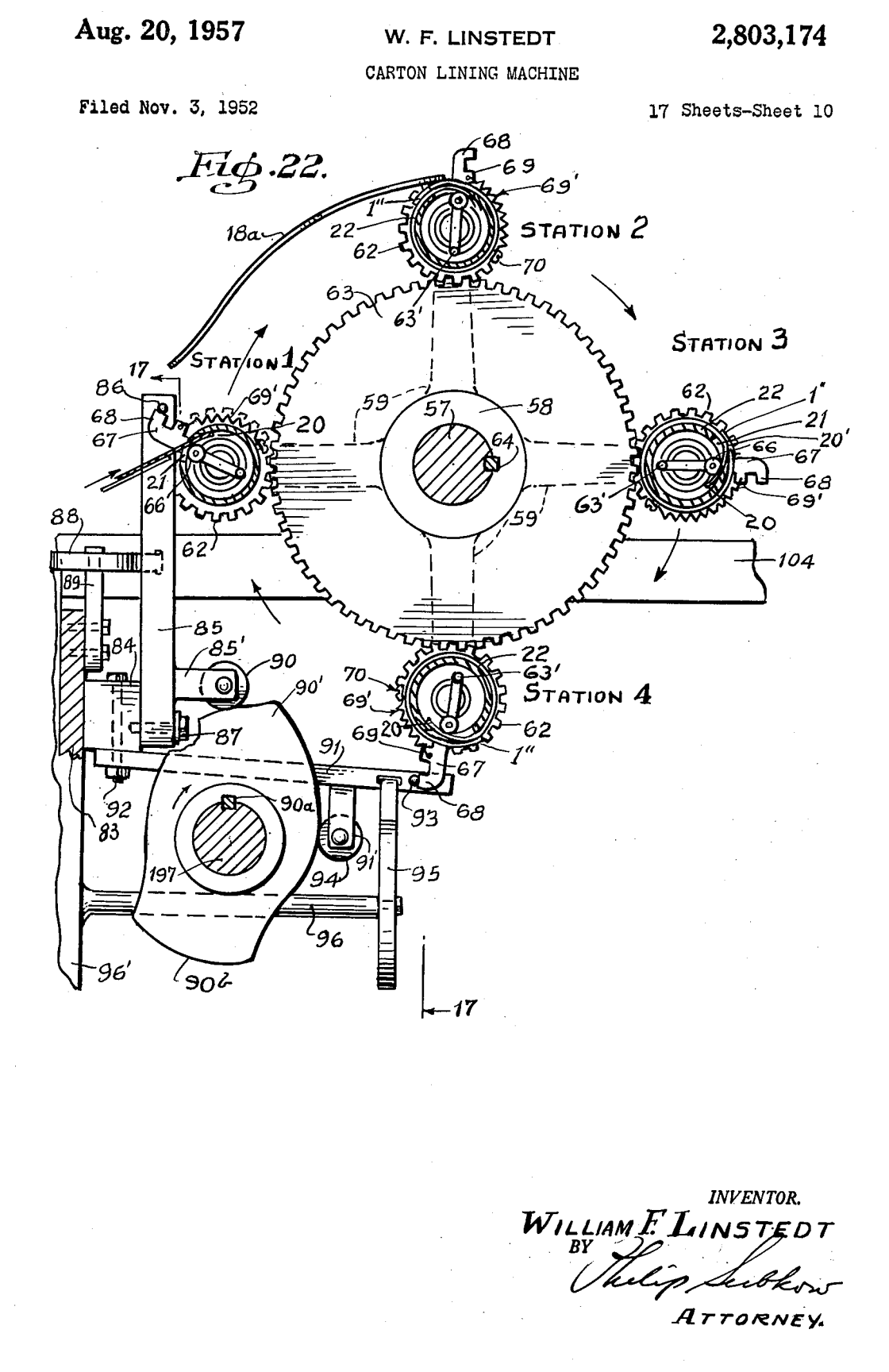

Intermediate the pivot 87 and the pin 86 is connected the end of a circular flat spiral spring 88 which is mounted upon the bracket 89 connected to the bracket 83. At the lower end of the arm 85 and between the pivot pin 87 and the point of connection of the spring 88 is an extension 85', on the lever 85, carrying a cam roller 90. Pin 86 is spaced from the center of rotation of the mandrel 22, at the first station, so that (as shown in Fig. 22) the dog 68 abuts the pin 86. The arm 91 is mounted on bracket 84 and extends at a small acute angle to the horizontal and is pivoted upon a vertical pivot 92 mounted in bracket 84. The other end of the arm 91 carries a pin 93 so positioned that the dog 68 abuts the pin 93 when the mandrel is in the fourth position. Intermediate pin 93 and the pin 92 is mounted a cam roller 94 rotatably mounted upon the depending lever extension 91'. Between the lever extension 91' and the pin 93 is mounted one end of the flat coil spiral spring 95, the other end of which is connected to the bracket extension 96 connected to the vertical frame member 96'.

Tucking mechanism

The tucking mechanism (see Figs. 4, 24–28) is composed of a plurality of tucker blades all actuated from the same cam 110. They are pivotally mounted and actuated to wipe across the end of the mandrel 22 to fold the end 1" of the wrapper 1', which extends over the free and unsupported end of the mandrel 22, to form three tucks. The first tucker (see Figs. 4 and 24) blade 97, is mounted on the arm 98 pivotally mounted upon pivot 99 on frame extension member 100. The lever arm 98 is actuated by a pivoted link 101, pivotally connected to the arm 98 on pivot pin 98' and also pivotally connected to the vertical cam lever arm 102 on pivot pin 116. The lever 102 is pivotally mounted at a point intermediate its ends upon a pivot pin 103 mounted in frame member 104. A cam roller 105 is mounted at the end of the arm 102. The cam roller operates in contact with a cam 110 rotatably mounted on the shaft 111 as will be described below. The cam roller 105 is held against the face of the cam 110 by a spring 112 attached to spring pin 113, mounted on lever 102 and to the pin 114 on the bracket 115 which is rigidly mounted on the non-rotating shaft 57.

The second tucker blade 117 (Figs. 4 and 25) is mounted upon an arm 118 fulcrumed on the pin 114 positioned on the racket 115. The spring 119 is connected to the pin 119' mounted upon the frame member 104, the other end being mounted on the pin 120 on the tucker blade 117. Intermediate the tucker blade end of the arm 118 and the fulcrum pin 114, on the arm 118, is located the link 121 fulcrumed on the pin 122 in the ear 123. The other other end of the link is mounted on the pin 124 in the outer end of the cam lever 125. The cam lever 125 is fulcrumed on the pin 126 in the frame member 104. The lever extension 125' is connected to the lever 125 at a point intermediate the pin 124 and the pin 126. The cam roll 127 is mounted on the stud 128 at the end of the extension 125'. The cam roll 127 is in contact with the cam 110 held in such contact by the tension of spring 119.

Mounted upon the bracket 129 (see Figs. 4 and 26), extending from frame member 104 and pivoted thereon on fulcrum pin 130, is a lever arm 131 carrying at one end thereof the tucker blade 132. The other end of the lever arm 131 carries a pivot pin 133. The link 134 is pivoted on pin 133 in lever 131 and carries on its lower end the cam roll 139, which is rotatably mounted on a lever 136 on pin 135. The lever 136 is also pivoted at its other end upon a frame extension 137 upon the pin 138. The cam roller contacts the cam 110 under tension of a spring 131' connected at one end to the lever arm 131 and at the other end to the frame 104.

Carton loading mechanism

Mounted upon the side of the bracket 129, supported on the angular brace 129' (see Figs. 1–4) is a magazine 106 (see Figs. 1, 2, and 8) into which cartons 107 may be loaded in vertical array, one on top of the other. The bottom of the magazine is open to permit the lowermost tube to drop into the receiving pocket 108 which is mounted at the upper end of a rock lever 109. The pocket 108 is in depth sufficient to receive one carton 107 and carries at one side thereof a shelf 140 so positioned that when the pocket 108 is moved to one side by the angular movement of the lever 109, as will be described below, the shelf 140 comes underneath the open end of the magazine, acting as a valve or closure therefor so as to hold the cartons within the magazine.

The lever 109 is guided in the slot 109a positioned on a bracket on the side of frame 1a (see Figs. 1 and 7). The lever 109 is pivoted, as its lower end, on the pivot pin 141, mounted in plate 106' positioned on the frame members 107a. The lever is reciprocated by means of the crank connecting rod 142 (see Figs. 1, 4 and 29), which is pivotally connected to the lever 109 at the pivot pin 143 and is connected to the crank arm 145 at crank pin 144. The crank 145 is rotated by sprocket 146 as will be described below. On the front face of the frame 147, is a pair of parallel rods 148 and 148' carried in brackets 149 (see Figs. 7, 23, 29 and 30). A slide 150 is slidably mounted upon the rods 148 and 148'. The slide is reciprocated by means of the bell crank arm 151 connected to the slide 150 by a connecting rod 151' pivoted on the bell crank 151 and on the slide. The bell crank 151 is pivotally mounted on the pivot shaft 152 (see Fig. 29) carried in bracket 153 mounted on the frame member 154 of the main frame 1a.

The bell crank 151 is fixed by set screw 155' on the vertical shaft 152 journalled in bearing 153 mounted on frame 154. The lower bell crank arm 155 is connected by a universal joint (see Figs. 5 and 29) consisting of a ball and socket connection 157 to the connecting rod 162. The connecting rod 162 (see Figs. 5 and 29) carries at its other end the universal ball and socket joint 163 mounted on the crank pin 164 on the crank arm 165. The crank arm is positioned on the inner end of the shaft 166 mounted in the bearings 167 on the frame members 168 and 168'. The sprocket 146 is mounted on shaft 166. The pusher arm 158 (see Figs. 4, 29 and 30) is mounted on the rod 159 which is attached to the slide 150 at the two vertical slide bracket extension ears 160. The arm 158 carries at its outer end a disc-like pusher plate 161.

The carton discharge mechanism

The carton 107 is discharged pneumatically by air introduced into the bore 71 of the shaft 61. To accomplish this the annular pad 170 (see Figs. 5, 7, 33–36 and 40) is pressed against open end 171 of the tubular shaft 61. The pad is connected to the end of a pipe 172 made fast to and carried on the arm 173 which is integral with the shaft 174 mounted in the bearings 176 on the front frame member 154a and rear frame member 154b. The arm 173 is restrained by spring 175 connected to the bracket 176' and to the arm 173. A stop 177 is mounted on frame 154.

Figure 40:
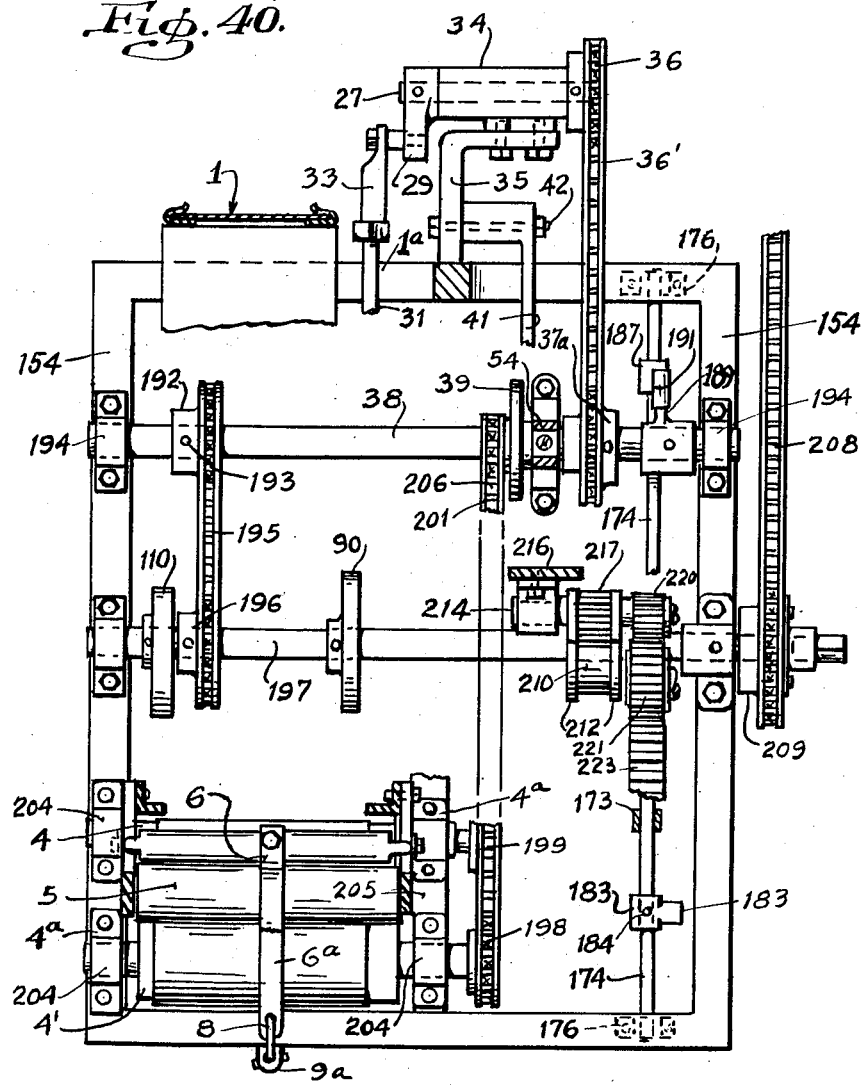
Fig. 40 is a section taken on the line 40—40 of Fig. 5 with parts in plan view for clearer showing.
Figure 41:
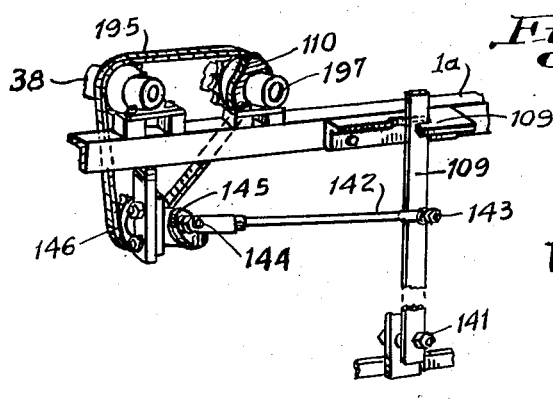
Fig. 41 is a perspective of a detail shown in Fig. 1.

The pipe 172 is connected to the hose 178 connected at its other end to the elbow 179 to which is connected a conventional air valve 180 (see Figs. 33, 34 and 40).

The valve stem 181 is pushed upward by the stud 182 adjustable in the lever 183, secured to the rock shaft 174 by the pin 184. The rock shaft 174 is provided with the L-shaped cam roll arm 185 having a projecting end 186 upon which is rotatably mounted the cam roll 187 held in place by the pins 188.

On the shaft 38 (see Figs. 5, 33, 40) is mounted a sector type cam 189 made fast on shaft 38 by the pin 190. The cam roll 187 contacts face 191 of the cam 189, which face is parallel to the rock shaft 174. The shaft 38, in the bearings 194 on frame member 154, is rotated by the sprocket 192 made fast to the shaft 38 by the pin 193. The sprocket 192 is driven by the chain 195 meshing with the sprocket 196 on the shaft 197.

Drive mechanism for machine

Drive for the paper feed mechanism.

The main drive is taken from a motor M and speed reducer R which drive a sprocket 207. The motor M is mounted on top of the machine (see Figs. 1, 4 and 5).

The sprocket chain 208 drives the sprocket 209 on shaft 197 (see Figs. 5, 37 and 40) and is constantly driven as will be observed.

Paper feed drive

Figure 4:
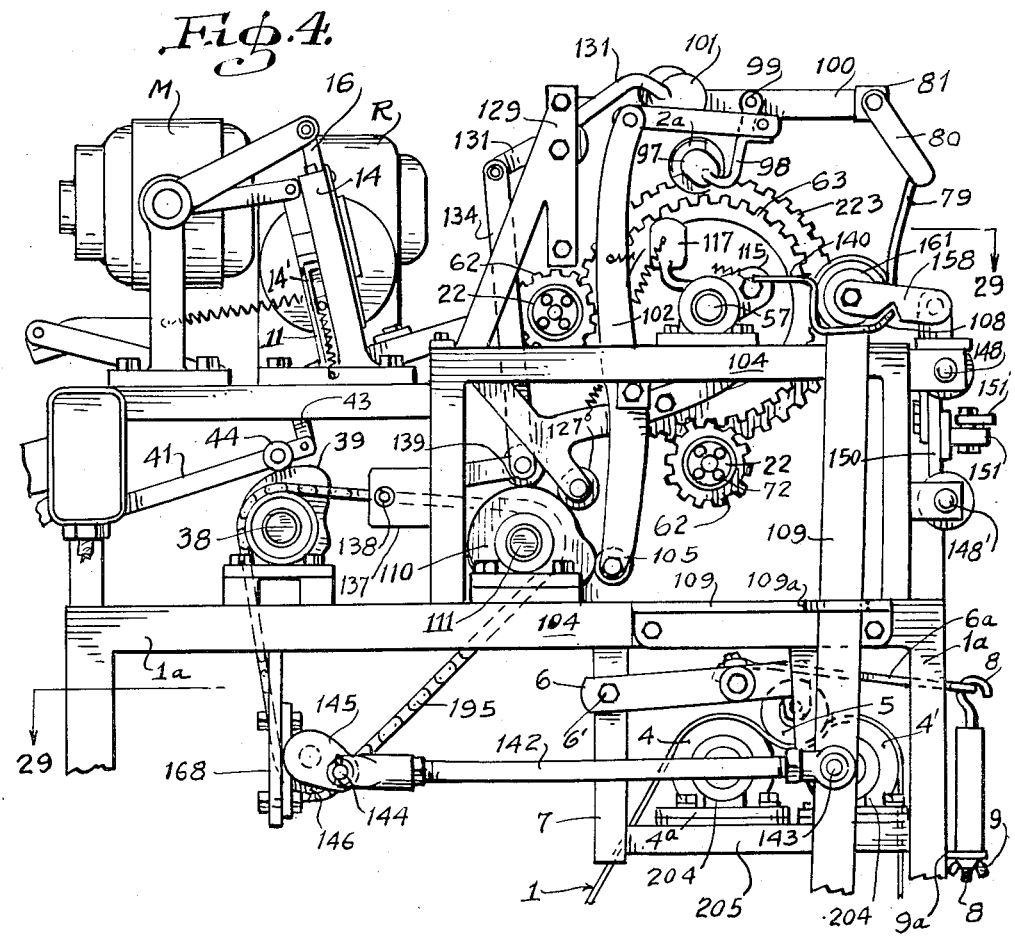
Fig. 4 is a side view of the machine with parts removed for clearer showing of other parts.
Figure 5:
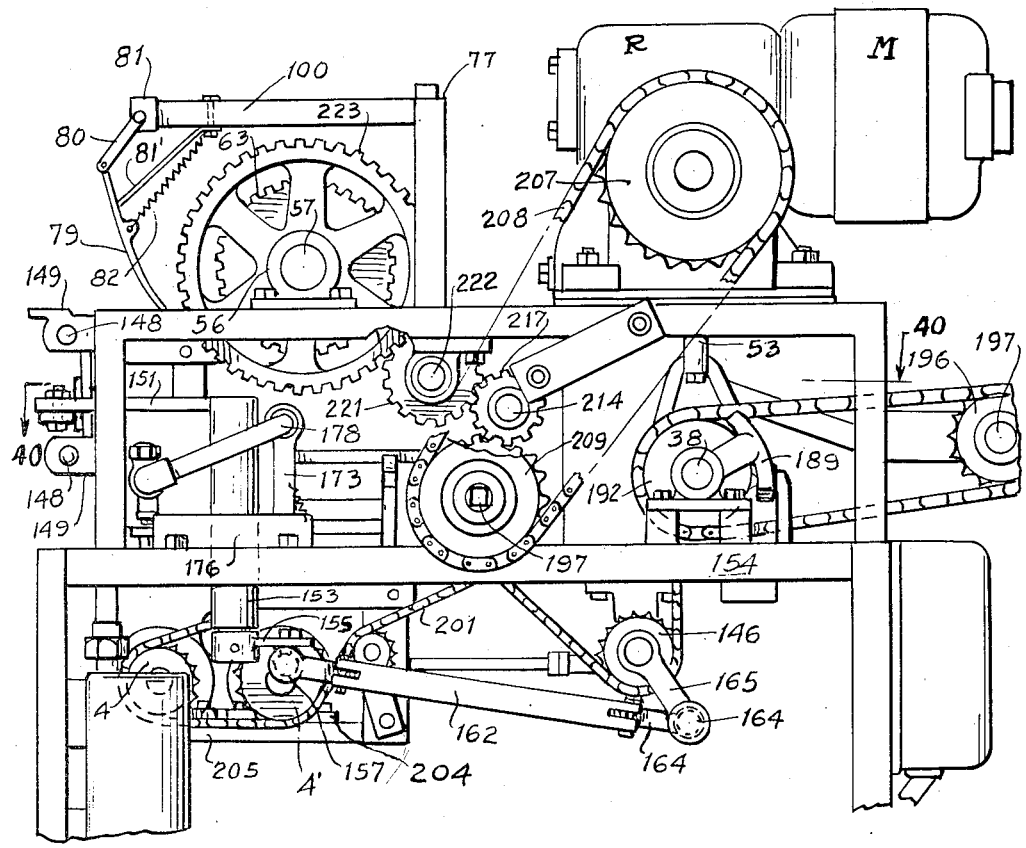
Fig. 5 is a side view of the machine, opposite to Fig. 4, with parts removed for clearer showing of other parts.
Figure 6:
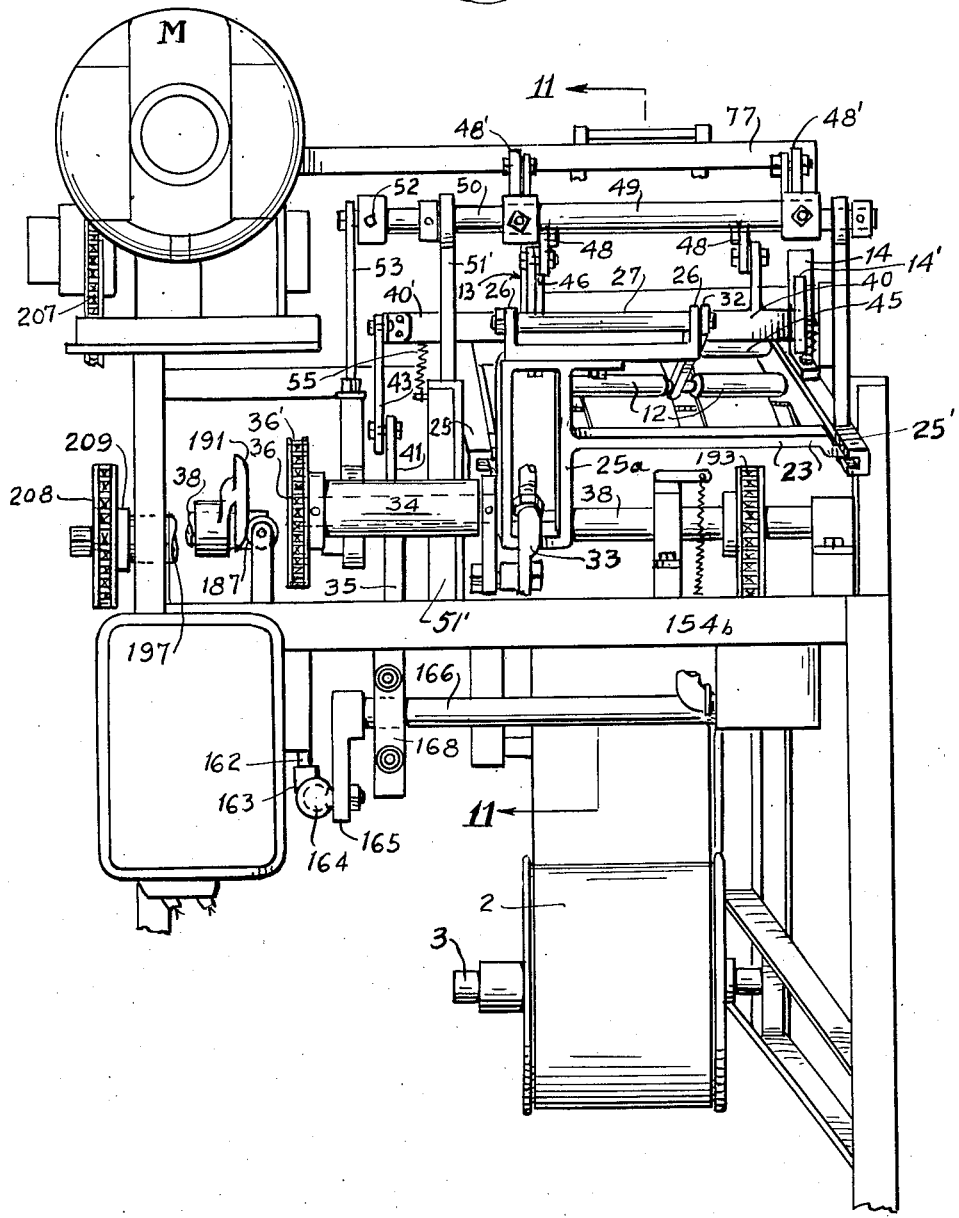
Fig. 6 is a back view of the machine with parts removed for clearer showing of other parts.

Feed rollers 4 and 4' (see Figs. 5 and 23) are driven through the sprockets 198 and 199 by means of a sprocket chain 201 which contacts the sprocket 198 and 199 mounted upon the feed roll shafts 202 and 203 journalled in the bearings 204 mounted on the brackets 205 (as seen in Figs. 4 and 5). The sprocket chain 201 is driven by a sprocket 206 mounted upon the cross shaft 38. Shaft 38 is rotated by sprocket 192, on shaft 38, through chain 195 driven by sprocket 196 on a shaft 197.

The paper feed mechanism is driven from shaft 38. The eccentric 54 and the cam 39 are mounted on shaft 38. The crank 29 is rotated by sprocket 36 on shaft 27 and the sprocket 36 is rotated by sprocket chain 36' meshed with sprocket 37a on shaft 38.

Turret intermittent four-stop-motion drive mechanism

An interrupted gear 210 is mounted on shaft 197. The gear carries gear teeth 211 covering a degree of arc which is proportioned to the gear train as will be described below. On each side of the interrupted gear 210 is a flange 212 (see Figs. 37 to 40 inc., and 42–46, inc.). The outer diameter of the flange 212 is on the pitch line of the gear 210 and the interrupted gear 210 is keyed, by the key 213, to the shaft 197 as are also the flanges 212. The initial and terminal teeth 210a and 210b of the gear 210 are shortened to the pitch line of the remaining teeth of the gear 210. The stub shaft 214 (see Figs. 5, 38, 39) is journalled in bearings 215 mounted on frame member 216 (see Figs. 5 and 39) of the main frame 1a. The stub shaft 214 carries a pinion 217 meshing with the teeth 211 of the interrupted gear 210. On each side of and made fast to the pinion 217 are flanges 218 and 219 all keyed to the stub shaft 214 by the key 213. The flanges 218 and 219, the diameters of which equal the pitch diameter of the teeth of the pinion gear 217, carry a depending concave arcuate portion having terminal wedges 218a and 218b.

The radius of curvature of the concave face 218c is equal to the radius of the periphery of the flange 212, as will be more fully described below.

Safety mechanism

The cut-off switch 224 (see Fig. 9) is mounted on the front of the frame 1a and connected in series with the motor M. The switch arm 225 is mounted to be depressed by the end 226 of the arm 227 so as to open the switch and stop the motor. The arm 227 is pivoted on a pivot pin 228 mounted on the frame 1a, on which the bell crank lever 229, connected to the lever 227, is also pivoted. The bell crank carries a shoe 230 so positioned that if the mandrel carries no outer carton it will clear the shoe but if it has a carton mounted on it, the shoe will be depressed causing the end 226 of the lever 227 to depress the switch arm 225 to open the switch.

The operation of the machine

The operation of the machine will be understood by the construction thereof given above.

The feeding of the paper

The paper 1 (which may be foil laminated to paper or any other flexible sheet material and which is to be used to form the carton liner) is drawn from the roll 2 by the driven feed rolls 4 and 4' against which the paper is frictionally held by the pressure roller 5. The pressure of the roller 5 is regulated by adjusting the thumb nut 9 (see Fig. 9) which presses on the plate 9a of the cross member 8a of the main frame 1a which draws the arm 6a downward to pull the roller 5 against the paper 1 passing over the rollers 4 and 4'. The rate of feed of the paper over the rollers 4 and 4' is regulated in relation to the rate of feed of sheets of paper to the mandrels as will be described below. This rate of feed is such that the paper hangs in a slack loop 10 and passes through the side guides 11 which act as gauges to center the paper in the paper feed mechanism. The paper is slid over the stationary inclined apron 10' by means of the reciprocating non-rotating feed roller 12. The outward stroke of the reciprocation of this roller feeds a length of paper, equal to that necessary to form the liner. The paper is pushed by the roller 12 into the mandrel slot 21 during the dwell of the mandrel at the first station. This is accomplished in the following manner: At the initiation of the dwell period, caused by the operation of the stop mechanism, the crank 29 is in the position shown in Fig. 11 with the roller 12 pressing against the paper 1 on the apron 10'. As the shaft 197 and the shaft 38 complete their rotation during the dwell period the crank 29 makes one counterclock revolution from the initial position shown in Fig. 11. During the first half portion of this revolution the slide 23 advances in the guideways 25 and 25' towards the pressure roller 45 and the knife 15, and in doing so the slide 23 carries with it the roller arm 32 and the roller 12. Since the roller 12 does not revolve, the roller drags the paper over the apron 10'. During this half revolution of the crank 29, the cam 39 has revolved a half a revolution from the position of the cam as shown in Fig. 11, and the cam roller 44 rides off the cam. The spring 55 (see Fig. 2) connected to the slide extension 40' pulls the slide 40 and the roller 45 downward on to the paper which has been pushed by the roller 12 underneath the roller 45. The paper is then held firmly in position by the pressure roller 45 against the apron 10'.

During this motion the eccentric 54 moves a half revolution from its high position causing the lever 48' to rock clockwise from the position shown in Fig. 11, causing the slide 16 and the knife 15 (as shown in Fig. 12) to descend to cut the paper. Just as the crank moves to complete its revolution described above, the bracket 33' mounted on the connecting rod 33 comes under the roller 37 and as the roller rides on to the bracket 33' it lifts the arm 32 with the roll 12 away from the paper, to the position shown in Fig. 12. The arm 32 during the remainder of the crank revolution rides in this disengaged position while the slide 23 is withdrawn in the guides 25 and 25' back to the position shown in Fig. 11. However, in that portion of the revolution of the crank 29 described above from the position shown in Fig. 13 to the position shown in Fig. 11 the connecting rod 33 makes an increasingly less acute angle with the horizontal, causing the connecting rod 33 and the bracket 33' to rock downward counterclockwise and causing the arm 32, under influence of the spring 31 to rock the shaft and arm 32 clockwise. The roller 12 thus descends from the position shown in Fig. 12 through the position shown in Fig. 13 until the roller 12 contacts the paper 1, on apron 10', to complete the cycle of operation, as the crank rotates into the position shown in Fig. 11. During this second half of the revolution of the crank 29 (see Fig. 2) the eccentric 54 completes its second half of its revolution and the cam 39 completes its second half of its revolution back to the position shown in Fig. 11. The return motion of the eccentric lifts the connecting rod 53 and the rock arm 50a causing the lever 48' to lift the slide 16 and the knife 15 back to the position shown in Fig. 11. The second half of the revolution of the cam 39 causes the roller 44 to ride on to the cam resulting in an upward rocking of the lever arm 41 to pivot counterclockwise on its pivot 42 lifting the link 43 and causing the slide 40 to lift the roller 45 off the paper and back to the position shown in Fig. 11.

Paper winding operation

The mandrels 22 are moved to each of the four mandrel positions by rotation of the turret spider 59 on the shaft 57. This is rotated by means of the fork arms 62' which embraces opposing arms 59 of the spider; the fork being rotated by the hub 56 connected to the gear 223. The gear 223 is rotated in four 90° rotations. Each 90° rotation occurs during the period that the teeth of the pinion gear 217 is enmeshed with the teeth 211 of the interrupted gear 210. During this rotation the mandrels are advanced from one station to the other and remain stationary, i. e. to dwell at such stations during the period that the arcuate face 218c rides over the periphery of the flanges 212 as it will be more fully described below. (See Figs. 2, 37–39, inc.)

Thus the rotation of the mandrels from one station to the other and the period of dwell at each such station occurs during one complete revolution of the sprocket 209 and of the shafts 38 and 197 (see Fig. 40). As the mandrel approaches station 1, the cam roller 90 rides on the cam 90' and in this position the lever 85 is in the position shown in Fig. 22. As the mandrel arrives at station 1, the dog 68 of the lever 67 intercepts pin 86 and the lever 67 is depressed, against the tension of the spring 69', causing the roller 66 to move from gripping position away from the interior surface of the hollow tubular mandrel 22 as is shown in Fig. 22. This permits the roller 12 (see Fig. 11) of the paper feed mechanism to push the leading edge 20' of the paper 1 into the slot 21 and between the interior face of the mandrel and the roller 66. During the dwell period, the continued rotation of the cam 90' clockwise brings the cam surface 90b under the cam roller 90 causing the roller 90 to tilt the lever 85 about its pivot 87, causing the pin 86 to move away from the dog 68 and permitting the spring 69' to snap the roller 66 against the paper to grip the paper against the interior wall of the hollow mandrel.

As the turret rotates 90° (see Figs. 9, 15 and 22) to move the mandrel from station one to station two, the planetary gear 62 traveling over the sun gear 63 causes the mandrel to rotate in a clockwise direction. During this rotation the leading edge of the paper is gripped by the gripping roller 66 against the interior wall of mandrel 22 and the paper is held in contact against the outer wall of the mandrel 22 by the steel loop 73 which acts as a wiping blade to smooth the paper against the mandrel. The paper is thus rolled around the mandrel into a convolute tube over the exterior surface of the mandrel 22. As the mandrel 22 approaches the station two it comes into contact with the spring guide 18a which wipes the trailing end 1" of the paper wrapper underneath the guide 18a and over the slot 21 to complete the overlapping convolute wound tube on the mandrel. The trailing end 1" of the paper is held in place by the roller 74 pressing against the exterior surface of the paper on the mandrel at station two. The loop 73 also contacts the paper to hold it against the exterior surface of the mandrel at this station. The leading edge 20 of the sheet is still gripped against the interior wall of the mandrel by the gripping roller 66.

Tucking operation

During the dwell period at station two, the overhanging end of the wrapped sheet extends beyond the free end of the mandrel 22 and is tucked into a three tuck closure over the free end of the mandrel.

At the beginning of the dwell period the tuckers will be in position shown in Fig. 24 except that the tucker 97 will be in the dotted position shown in Fig. 24 and the high point of the cam 110 is in advance of its position shown in Fig. 24, i. e. some degrees clockwise from the position shown in Fig. 24. The cam makes one revolution during the dwell period. It first moves to the position shown in Fig. 24, wherein the cam roller 105 rides on to the high point of cam 110, causing the lever 102 to rock on the pin 103 drawing the tucker blade 97 from the dotted position to the full line position as shown in Fig. 24 across the extending end of the wrapper to make the first folding tuck.

As the cam rotates anti-clockwise into the position shown in Fig. 25, the cam roller 105 rides off the high point of the cam 110 permitting the lever 102 to rock under the influence of the spring 112 to move the tucker blade 97 to the position shown in Figs. 25 and 26. The high point of the cam 110 then comes under the cam roll 127 causing the roller to rock lever 125' about the pin 126 and to rotate the tucker blade lever arm 118 clockwise, about the pivot pin 114, thus causing the tucker blade 117 to wipe over the extending end 1" of the sheet 1' to make the second folding tuck which overlaps the first fold. The high point of the cam 110 then travels counterclockwise as the cam rotates and the cam roller 127 rides off the high point and the tucker blade 117 is withdrawn from the position shown in Fig. 25 to the position shown in Fig. 26 under the influence of the spring 119.

During this rotation of the cam 110 the high point of the cam has come under the cam roller 139, causing the link 134 to rotate the tucker blade arm 131 clockwise, about the pivot pin 130, from the position shown in Fig. 25 to the position shown in Fig. 26, making the third folding tuck to complete the closure of the paper tube by means of the overfolded, i. e., overlapping, folds. The cam continues its rotation, counterclockwise, for the remainder of its rotation. During such remaining portion of the cam 110 rotation, the cam roller 139 rides off the high point of the cam 110 and the spring 131' pulls the lever 131 down causing it to pivot counterclockwise and to withdraw the tucker blade 132 from the position in Fig. 26 to the initial position of the tucker blades as described at the initiation of the tucking operation.

Upon the completion of this 360° rotation of the cam, during which the extending end 2a of the sheet has been tucked in three tucks to make an enclosure for the tubular wrapped sheet, the dwell period of the mandrel at station two has been completed. The turret now makes a second 90° rotation to bring the mandrel from station two to station three. In doing so the outer surface of the paper rolls over the spring blade 73 and is held against the exterior surface of the mandrel until it approaches station three where it comes in contact with the roller 78 (see Fig. 9) which presses against the mandrel and holds the overlapping end 20' against the exterior surface of the mandrel 22. The paper on the mandrel is spaced from the spring 73 by a distance somewhat greater than the thickness of the carton which is to be pushed over the mandrel and paper, at station three, as will now be described.

Carton loading operation

As the turret moves from position two to position three the crank 165 (see Figs. 5 and 29) moves the bell crank 151 from the dotted position shown in Fig. 29 and moves the slide from the extreme dotted position shown in Fig. 29 to start the pusher 161 to the left as Figs. 29 and 7 are viewed. At the same time crank 145 (see Fig. 4) pulls the lever 109 from the position of Fig. 4, also shown in full line in Fig. 8, to the dotted position shown in Fig. 8 by the time that the pusher 161 approaches its extreme outer travel, in order to clear way for the pusher to reach its position of extreme travel.

Just before the pusher 161 has reached its outwardmost position of travel and has cleared the end of the pocket 108 and while it is moving outwardly to reach its extreme travel, as shown in dotted lines in Fig. 29, the crank 145 has started the lever 109 rotating clockwise carrying with it the carton 107 and bringing the shelf 140 toward the open end of the magazine 106. The crank 165 continues its rotation drawing the pusher slide and pusher to the right (see Fig. 29) and by the time the pusher 161 is in carton pushing position the pocket with the carton has reached its outer position in registry with the mandrel and the shelf is under the magazine to close its open end. The continued rotation of the shaft 166, completing the rotation of the crank 165, draws the pusher plate through the pocket and pushes the carton guided by the pocket and the trough 107b over the wrapper and on the mandrel. The bell crank finally reaches the dotted position in Fig. 29 at station three. At the same time that the pusher clears the end of the pocket and presses the carton 107 against the tucked end of the liner at the free end of the mandrel, the crank 145 rocks the carton pocket 108 back to the dotted position shown in Fig. 8 completing the cycle of operation of the carton loading operation, which has occurred during the dwell period at station three.

*Carton discharge operation*

As the mandrel moves into station four the lever 67 is intercepted by pin 93, causing the lever 67 to rock the shaft 63' (see Fig. 22) drawing the gripping roll 66 away from gripping position against the paper on the interior surface of the mandrel.

The continued rotation of shaft 38 during the dwell period at station four moves the sector cam 189 against the cam roll 187, causing the shaft 38 (see Figs. 33, 34 and 40) to rock the rock shaft 174 and thus to move the lever 173 and the air pad 170 counterclockwise. This brings and presses the pad 170 against the end of the hollow shaft 61 and brings the hose 178 into fluid communication with the hollow bore 71 of the shaft 61. At the same time the lift arm 183 causes the adjustable stud 182 to press against the valve stem 181 to open the valve 180 and to cause compressed air from the tank to generate air pressure inside the hollow mandrel and against the tucked end of the liner and the end closure of the carton, through the vent holes 72. The air pressure blows the carton and liner off the mandrel at station four and the carton strikes the deflector plate 108' (see Fig. 32) underneath the guard canopy 108 to direct the lined carton and to a suitable container 108". The continued rotation of the shaft 38, completing the revolution of the shaft, draws the sector cam 189 off the roll 187, permitting the shaft 174 to rock clockwise under the influence of spring 175, withdrawing the valve lift 182 from the valve stem, which thereupon closes, and at the same time withdrawing the pad 170 from the end of the hollow shaft 61. This cycle of the operation for the discharge of the liner and carton occurs during the dwell period of the mandrel at station four.

*The operation of the stop motion mechanism for the machine*

As shown in Fig. 42, the interrupted gear 210 revolves clockwise in the direction of the arrow. The pinion gear remains stationary while the arcuate face 218c rides on the periphery of the flange 212. When the gear 210 has rotated sufficiently to bring the stub tooth 210a into contact with the gear 217, the pinion is caused to rotate counterclockwise as the gear 210 rotates clockwise and the rotation of the gear 217 causes the wedge 218a to enter the notch 211a (as shown in Fig. 43). The continued rotation of the gear 217, meshing with the gear 210, causes the gear 217 to rotate from the position shown in Fig. 43 to the position shown in Fig. 44. Upon further rotation of the gear 210, the gear 217 is rotated sufficiently so that the wedge 218b approaches the notch 211b, as shown in Fig. 45, and on further rotation the wedge 218b enters the notch 211b. On further rotation the wedge rotates in the notch until the terminal stub tooth 210b leaves the leading tooth of the pinion (see Fig. 46) whereupon the arcuate face rolls into contact with the periphery of the flange 211 (see Fig. 46). This occurs during a 90° rotation of the turret. During the remainder of the revolution of shaft 197 the arcuate face 218c rides on the flange 212 from the position shown in Fig. 47 to that shown in Fig. 42. During this period the turret has stopped and the mandrels dwell in their stations.

While I have described a particular embodiment of my invention for the purpose of illustration, it should be understood that various modifications and adaptations thereof may be made within the spirit of the invention as set forth in the appended claim.

I claim:

A carton lining machine which comprises a turret adapted to be rotated intermittently in a given direction to a plurality of stations, at least one cylindrical hollow mandrel mounted on said turret for movement with the turret to feeding, inserting and discharge stations, the mandrel being mounted on the turret for relative rotation on the cylindrical axis of the mandrel, a longitudinal slot in said mandrel, a gripping element being movable between a gripping position against the interior wall of the mandrel and an open position spaced from said wall, resilient means on said mandrel normally and constantly urging said gripping element from open toward gripping position throughout rotation of the mandrel, a grip lever operatively connected to said gripping element and projecting from the mandrel, said projecting lever being movable circumferentially of the mandrel in the direction of rotation of the mandrel when said resilient means moves the gripping element to gripping position and said projecting lever being movable counter to the direction of rotation of the mandrel to move the gripping element to open position against the urging of said resilient means, means for rotating the mandrel to predetermined angular feeding position at said feeding station with said slot in position to receive one end of a sheet of material, first movable stop means normally located at said feeding station in a position adapted to be engaged by said grip lever just before the mandrel reaches its feeding position, said stop causing relative movement of the grip lever and gripping element to open position in response to final rotation of the mandrel to feeding position, means at the feeding station for advancing one end of said sheet into the slot between the interior wall of the mandrel and the open gripping element, means for thereafter moving said first stop out of engagement with the grip lever and thereby providing resilient movement of the gripping element to closed position before the mandrel leaves the feeding station, means to rotate said mandrel to wind said sheet into a tubular portion about the exterior wall of said mandrel with the tubular sheet of material extending beyond an end of said mandrel, folding tucking means located between said feeding and inserting stations for tucking the extending portion of said sheet directly against said mandrel end to form a closed overfolded end of said tubular portion, means at said inserting station for inserting an outer carton tube with a closed end over said sheet on the mandrel, with the closed carton tube end engaging and holding the overfolded end of the tubular sheet portion, second movable stop means normally located at said discharge station in a position adapted to be engaged by said said grip lever just before the mandrel reaches its discharge position, said second stop causing relative movement of the grip lever and gripping element to open position in response to final rotation of the mandrel to its discharge position, means for removing the wrapped sheet and carton from said mandrel at the discharge station, and means for thereafter moving said second stop out of engagement with the grip lever and thereby providing resilient movement of the gripping element to closed position before the mandrel leaves the discharge station.

(References on following page)

References Cited in the file of this patent

UNITED STATES PATENTS

| | | |
|---|---|---|
| 486,088 | Cromwell | Nov. 15, 1892 |
| 1,312,570 | Palmer | Aug. 12, 1919 |
| 1,399,636 | Malm | Dec. 6, 1921 |
| 1,635,057 | Piermattei | July 5, 1927 |
| 1,721,527 | Neumair et al. | July 23, 1929 |
| 1,864,632 | Bergstein | June 28, 1932 |
| 2,066,414 | Milmoe | Jan. 5, 1937 |
| 2,163,318 | Scusa et al. | June 20, 1939 |
| 2,357,535 | Monroe | Sept. 5, 1944 |
| 2,579,907 | Condon | Dec. 25, 1951 |
| 2,639,646 | Thompson et al. | May 26, 1953 |